Feb. 18, 1969

J. C. STILES 3,427,828

GYRO WITH FLEXURE HINGE

Filed Dec. 16, 1966

INVENTOR.
JOHN C. STILES
BY
Constantine A. Michalos
ATTORNEY

United States Patent Office 3,427,828
Patented Feb. 18, 1969

3,427,828
GYRO WITH FLEXURE HINGE
John Callender Stiles, Mountain Lakes, N.J., assignor to General Precision Systems Inc., a corporation of Delaware
Filed Dec. 16, 1966, Ser. No. 602,230
U.S. Cl. 64—15
Int. Cl. F16d 3/56; G01c 19/04
7 Claims

ABSTRACT OF THE DISCLOSURE

This invention relates to a flexure joint or suspension torsion hinge providing a two-axis support to the rotor of a free rotor gyroscope having a high angular compliance and a low radial compliance. In its overall configuration, the flexure member or torsion hinge comprises a cylindrical outer portion and a concentric annular inner portion connected to the outer portion by four equi-angularly spaced, thin, radial webs. Equi-angularly spaced between the webs, the cylindrical outer portion contains four radial apertures. The diameter of these apertures is materially larger than the axial dimensional thickness of the inner annular portion. A pair of chordal slots are formed in a plane axially displaced from one face of the annular inner portion, cutting through the cylindrical portion at a diametrically opposite location, and connecting between pairs of adjacent apertures. Similarly, different adjacent pairs of apertures are connected by respective diametrically opposed cuts displaced axially from the other face of the annular inner portion. The chordal cuts or slots effectively divide the unit into three segments interconnected by the thin radial web portions which define torsional axes, permitting relative angular displacement of the three segments about mutually perpendicular axes.

---

The present invention relates generally to free rotor gyroscopes, and particularly to a flexure joint or a two-axis suspension torsion hinge for providing radial support to the rotor of a free rotor gyroscope.

This invention constitutes an improvement over U.S. Patent No. 3,354,726 by Walter J. Krupick and Richard F. Cimera, the latter assigned to the same assignee as this invention.

Heretofore, the hinge or flexure joint assembly comprised of a top ring, an intermediate ring and a bottom ring, all machined out of a single piece of material. The intermediate ring is connected to the top and bottom rings through an area which is locally machined to be very thin, thus forming a flexure hinge. The thin area, which is the critical portion of the assembly, is formed by a double blind drilling operation followed by precision grinding to a tolerance of 50 microinches. This has proven to be a time consuming and expensive operation. Furthermore, the old hinge supports radial loads through extension and compression of the hinge section and is thus subject to failure by buckling, while in the present hinge, one hinge will always be under tension regardless of the direction of load and therefore buckling failure is prevented.

Therefore, an object of this invention is to provide for a flexure joint or two-axis torsion hinge for radial support to a rotor of a free rotor gyroscope.

Another object f this invention is to provide for a flexure joint or torsion hinge having a high angular compliance and a low radial compliance.

An additional object of this invention is to provide a torsion hinge which is much simpler in fabrication and is of a higher quality for radial support to the rotor of a free rotor gyroscope.

Other objects and many additional advantages will be more readily understood by those skilled in the art after a detailed consideration of the following specification taken with the accompanying drawings wherein.

Figure 1:
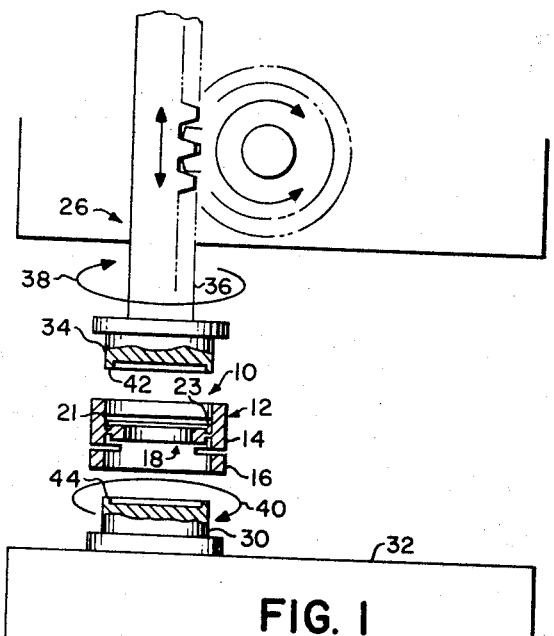
FIGURE 1 is an elevational schematic view of the first step in the fabrication of a torsion hinge in accordance with a preferred embodiment of this invention.

Referring to the drawing of FIGURE 1, there is shown a first step in the fabrication of a flexure joint or single-piece two-axis suspension torsion hinge 10 for providing radial support to a rotor of a free rotor gyroscope (not shown). The present hinge 10, as in the hereinbefore hinge, is fabricated of a single piece having a cylindrical outer body portion 12 which includes a top ring 14 and a bottom ring 16 and a concentric annular inner body portion or intermediate ring 18 connected to the outer portion 12 by four equi-angularly spaced thin radial webs 21, 22, 23, and 24 as viewed in FIGURES 1 and 2. The intermediate ring 18 is connected to the top ring 14 by the two webs 21 and 23 and is connected to the bottom ring 16 by the two webs 22 and 24. The three rings 14, 16 and 18 are separated by the four webs 21, 22, 23 and 24 so as to flex in torsion rather than in bending. An advantage of having the webs 21, 22, 23 and 24 flex in torsion rather than in bending is that it makes the surfaces of the webs 21, 22, 23 and 24 much more accessible to machinging and measuring operations so that all four webs 21, 22, 23 and 24 can be formed at once, as best shown in FIGURE 1. Furthermore, it permits the use of a flat cross-section rather than the curve section as provided in the hinge of the copending application 484,648, since flat sections have a much more favorable ratio of bending stiffness to lateral stiffness. These improvements were demonstrated both by theory and by experiment.

Figure 3:
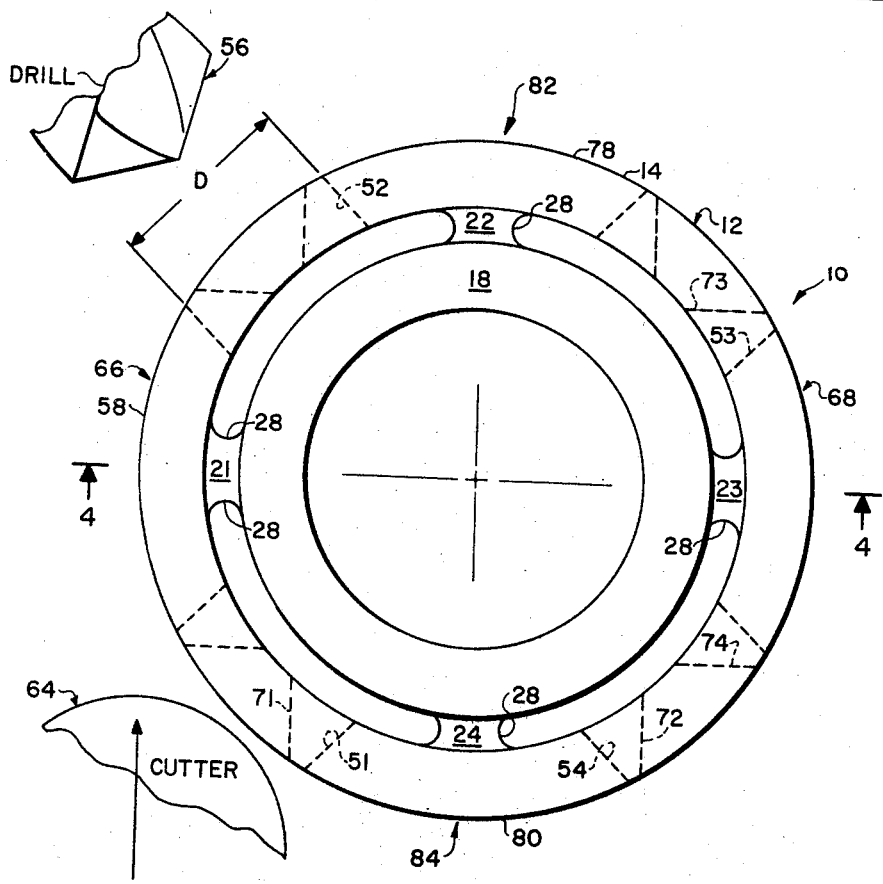
FIGURE 3 is an enlarged top view of the hinge shown in FIGURE 2, and further showing in detail the second stage of its fabrication; and, FIGURE 4 is an enlarged side sectional view of the hinge taken substantially along line 4—4 of FIGURE 3.

The open construction of the new hinge 10 permits it to be fabricated entirely with an upright drill press or upright milling machine 26, as shown in FIGURE 1, and there is no requirement for precision grinding or electric discharge machining. Furthermore, the final hinge thickness, which is the critical dimension, can be obtained by a simple lapping operation, as again shown in FIGURE 1, as opposed to a multiple precision grinding operation needed in the previous hinges. As shown in FIGURE 3, it should be noted that, while the webs 21, 22, 23, and 24 of the hinge 10 are shown to be flat in cross-section with end filets 28, the open construction of this hinge 10 allows a wide variety of cross sections to be employed.

More specifically, the means of fabricating the novel hinge 10 is by having a base jig 30 rotatably supported on a base table 32 of the upright drill press or upright milling machine 26 and a counter rotatable opposed upper jig 34 rotatably supported by a spindle portion 36 of the machine 26. Before installing a one-piece blank from which the hinge 10 is fabricated between jigs 30 and 34, the upper jig 34 is lowered upon the base jig 30 and then rotated in opposed directions as shown by arrows 38 and 40 to accurately lap a lower tool bit edge 42 of the upper jig 34 to an upper tool bit edge 44 of the lower or base jig 30. By this method, the machine is provided with substantially perfect cutting or lapping edges 42 and 44 for the first step in the fabrication of the hinge assembly 10.

Therefore, the first step in the fabrication of the hinge assembly 10 is to insert a blank, roughly machined in the shape of the hinge 10 between the two accurately aligned jigs 30 and 34 and counter rotate the jigs, as shown by the arrows 38 and 40, until the four very thin radial webs 21, 22, 23 and 24, in the order of .00140 to .00200 of an inch, are produced.

Figure 2:
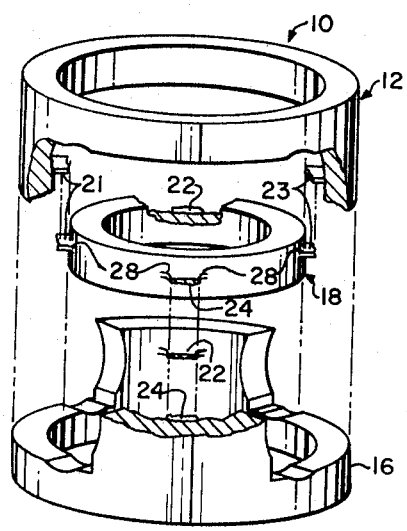
FIGURE 2 is an enlarged expanded detailed side view somewhat in perspective and partly in section of the hinge shown in FIGURE 1.

Therefore, as best shown in the expanded detailed side view of FIGURE 2, the hinge 10 will be provided with the four very thin webs 21, 22, 23 and 24 with substantially equal thickness since the edges of the jigs 30 and 34 were first lapped, in the first operation of forming the hinge 10, before the lapping operation of the webs.

Figure 4:
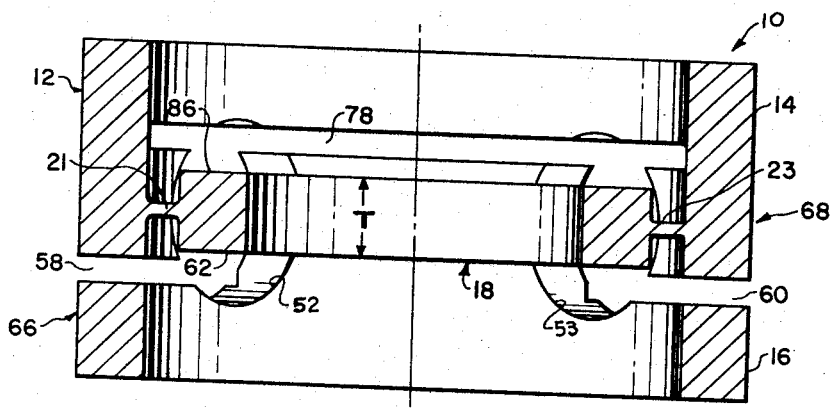

Referring to FIGURES 3 and 4, the second stage or operation in forming the one-piece hinge 10 is shown. Four equi-angularly spaced apertures 51, 52, 53 and 54 are formed by means such as a drill 56. As brought out before, the diameter D of these apertures 51, 52, 53 and 54 are materially larger than the axial dimensional thickness T of the annular inner or intermediate ring 18. Further, a pair of chordal slots 58 and 60, as best shown in FIGURE 4, are formed in a plane axially displaced from one face 62 of the annular intermediate ring 18, cutting through by a cutter 64 the cylindrical outer portion 12 at diametrically opposed locations 66 and 68 and connecting between a pair adjacent apertures 51–52 and 53–54 respectively. Again, as brought out before, in the second operation in forming the hinge 10, different adjacent pairs of apertures 52–53 and 51–54 are connected by respective diametrically opposed cuts 73 and 74 by the cutter 64 forming slots 78 and 80 at opposed locations 82 and 84 displaced axially from another face 86 of the annular intermediate ring 18. The chordal cuts or slots 71 and 72 and 73 and 74 effectively divide the hinge 10 into the three rings 14, 16 and 18, connected only by the thin radial webs 21, 22, 23 and 24 herein described. By these operations in forming the simple open overall nature of the fabricated hinge 10, there is defined a flat overall hinge 10 which operates in torsion rather than bending, and which defines torsional axes permitting relative angular displacement of the three rings 14, 16 and 18 about a pair of mutually perpendicular axes passing longitudinally and colinearly through webs 21 and 23 on the one hand and webs 22 and 24 on the other hand, respectively. It will be noted further that each of said torsional axes, in turn, is mutually perpendicular to a central axis passing vertically through hinge 10 as viewed in FIGURES 3 and 4 thus providing a hinge construction having three commonly intersecting mutually orthogonal principle axes of symmetry.

While the present invention has been described in preferred embodiments, it will be obvious to those skilled in the art that various modifications can be made therein within the scope of the invention, and it is intended that the appended claims cover all such modifications.

What is claimed is:

1. A universal flexure hinge having three commonly intersecting mutually orthogonal principal axes of symmetry comprising:
  an inner body member having a first pair of diametrically opposed radially extending webs disposed longitudinally and colinearly with respect to a first one of said principal axes and a second pair of diametrically opposed radially extending webs disposed longitudinally and colinearly with respect to a second one of said principal axes, each of said first and second pairs of webs being adapted to rotate in torsion about said first and second principal axes respectively,
  an upper outer body member axially spaced above said inner body member along a third one of said principal axes and having a pair of diametrically opposed downwardly extending portions substantially normal to said first axis, said portions being attached to the radially outer ends of said first pair of webs respectively whereby said upper outer body member may rotate in torsion relative to said inner body member about said first principal axis through said first pair of webs, and
  a lower outer body member axially spaced below said inner body member along said third axis and having a pair of diametrically opposed upwardly extending portions substantially normal to said second axis, said portions being attached to the radially outer ends of said second pair of webs respectively whereby said lower outer body member may rotate in torsion relative to said inner body member about said second principal axis through said second pair of webs.

2. The flexure hinge of claim 1 wherein said first and second pairs of webs are integral with respect to said inner body member and said upper and lower body member portions respectively whereby said hinge comprises a one piece structure.

3. The flexure hinge of claim 2 wherein each of said web has a flat relatively thin cross-section whereby the respective pairs of diametrically opposed webs provide an independent support for said upper and lower body members having high-angular compliance and low radial compliance.

4. The flexure hinge of claim 2 wherein:
  said upper outer body member comprises a first cylindrical ring and said lower outer body member comprises a second cylindrical ring axially spaced from and extending substantially parallel to said first ring,
  wherein said inner body member comprises a concentric annular intermediate ring, and
  wherein said webs extend substantially perpendicularly between the downward extending portions of the first ring and the peripheral outer surface of said inner ring and between the upwardly extending portions of the second ring and the peripheral outer surface of said inner ring, respectively.

5. The method of fabricating a two-axis, flexure hinge from a single piece of stock comprising an outer hollow cylindrical member and an inner concentric annular ring supported intermediately within said cylinder by two pairs of equi-angularly spaced diametrically opposed radially extending webs wherein the steps of said method include:
  forming first, second, third, and fourth equi-angularly spaced apertures in the wall of said outer cylinder, each of said apertures being centered on a radial extending substantially intermediately between a corresponding pair of said webs and each of said apertures having a diameter larger than the axial dimensional thickness of said inner concentric ring,
  forming a first pair of diametrically opposed chordal slots in the wall of said outer cylinder, said first pair of chordal slots being located in a plane axially displaced from and parallel to one axial surface of said inner ring whereby diametrically opposed portions of the connecting wall between the first and second apertures and between the third and fourth apertures are removed,
  forming a second pair of diametrically opposed chordal slots transverse to said first pair of chordal slots in the wall of said outer cylinder, said second pair of transverse chordal slots being located in a plane axially displaced from and parallel to the other axial surface of said inner ring whereby diametrically opposed portions of the connecting wall between the second and third apertures and between the first and fourth apertures are removed thereby separating said outer cylinder into a pair of axially disconnected portions each of which is connected to said inner ring by a pair of diametrically opposed webs and wherein each said pair of webs is perpendicular to the other pair of webs thereby defining the two flexure axes of said hinge.

6. The method of claim 5 further comprising the step of grinding and lapping said webs with counter-rotating tool bits extending into said hollow cylinder from axially opposed directions respectively to form webs having thin cross-sectional configurations and parallel upper and lower surfaces before said first, second, third, and fourth apertures are formed.

7. The method of claim 6 further comprising the step of lapping said counter-rotating tool bits by mutual engagement theretogether to form a pair of tool bits that rotate in a substantially parallel plane, said lapping of the tool bits being performed before grinding and lapping of said webs as hereinaforesaid.

References Cited

UNITED STATES PATENTS

| 2,475,010 | 7/1949 | Chilton | 64—15 |
| 2,627,733 | 2/1953 | Amberg | 64—15 X |
| 2,860,495 | 11/1948 | Stark | 64—11 |
| 3,306,188 | 2/1967 | Couzens et al. | 64—15 X |
| 3,354,726 | 11/1967 | Krupick et al. | 74—5 |

LLOYD L. KING, *Primary Examiner.*

WILLIAM E. WAYNER, *Assistant Examiner.*

U.S. Cl. X.R.

29—436; 74—5